United States Patent [19]

Rudolph et al.

[11] Patent Number: 4,951,999
[45] Date of Patent: Aug. 28, 1990

[54] HIGH LIFT DUMP TRUCK

[75] Inventors: Robert Rudolph, Vineland; Paul Mercurio, Elmer, both of N.J.

[73] Assignee: PM Equipment Sales, Inc., Vineland, N.J.

[21] Appl. No.: 310,656

[22] Filed: Feb. 15, 1989

[51] Int. Cl.$^5$ ............................................. B60P 01/34
[52] U.S. Cl. ........................................ 298/11; 296/56; 296/57.1; 296/184; 298/17.5; 298/225
[58] Field of Search ...................... 296/51, 52, 56, 57.1, 296/184; 298/11, 17 B, 17.5, 22 J, 25

[56] References Cited

U.S. PATENT DOCUMENTS

| 403,628 | 5/1889 | Watt | 296/52 |
| 1,650,815 | 11/1927 | Barrett | 298/11 |
| 1,775,971 | 9/1930 | Samuelsen | 296/56 |
| 2,499,919 | 3/1950 | Hughes | 298/11 |
| 3,030,139 | 4/1962 | Fite | 296/184 X |

FOREIGN PATENT DOCUMENTS

| 688122 | 2/1953 | United Kingdom | 296/51 |
| 2063184 | 6/1981 | United Kingdom | 298/22 J |
| 2141399 | 12/1984 | United Kingdom | 298/11 |

Primary Examiner—Robert J. Spar
Assistant Examiner—Janice Krizek
Attorney, Agent, or Firm—Eugene E. Renz, Jr.

[57] ABSTRACT

A high lift dump truck having a chassis on a truck, and a body portion having a tailgate being positioned on the chassis and being supported in a lowered position. A front hoist having a first end pivotably mounted at a generally central location on the chassis. The front hoist has a second end pivotably mounted on the body and the front hoist is positioned to raise the body to a maximum front elevation above the chassis. A rear hoist has a first end pivotably mounted at a generally rear location on the chassis and a rear hoist has a second end pivotably mounted on the body generally near the tailgate end of the body. The rear hoist is positioned to raise the body to a maximum rear elevation above the chassis. A control link has a first end pivotably mounted on the chassis adjacent the rear location and has a second end mounted on the body at a generally central location, whereby the link defines a locus of movement of the second end when the body is raised. A control is provided for activating the front and rear hoist independently to permit the body to be raised to the maximum front and rear elevations.

11 Claims, 5 Drawing Sheets

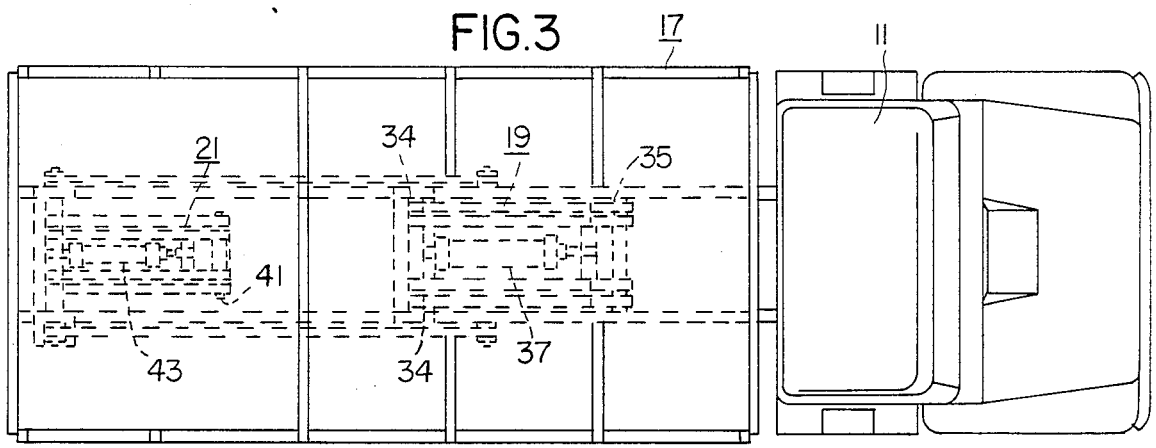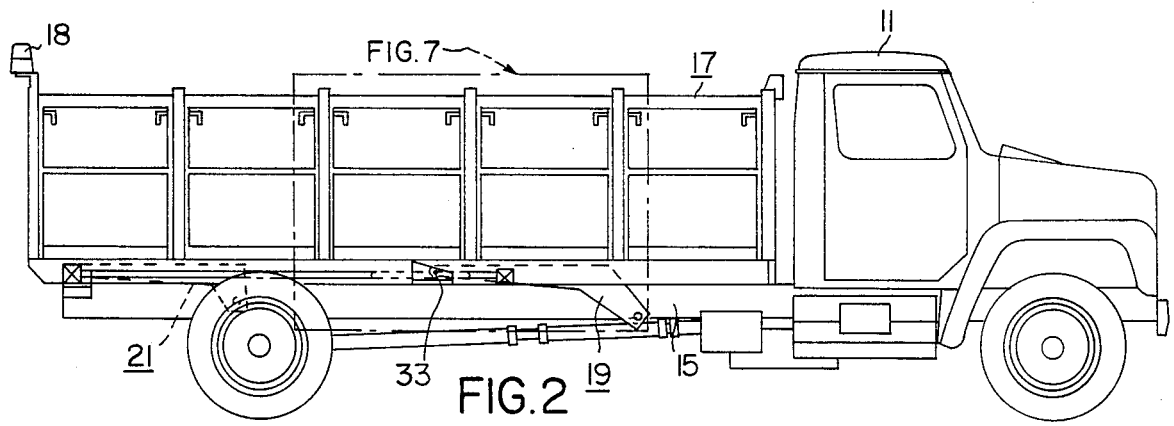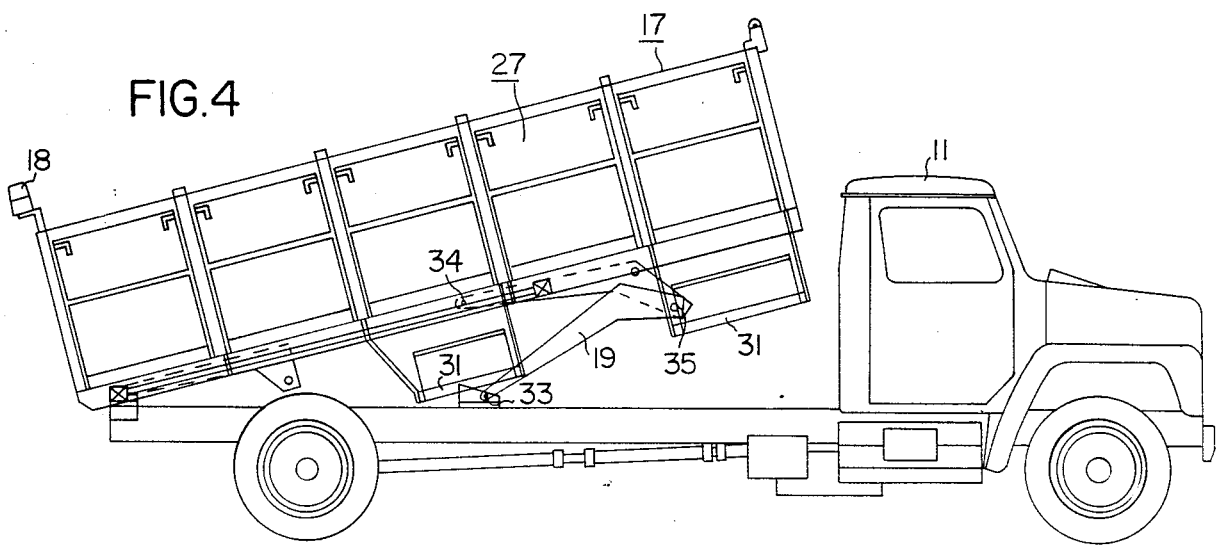

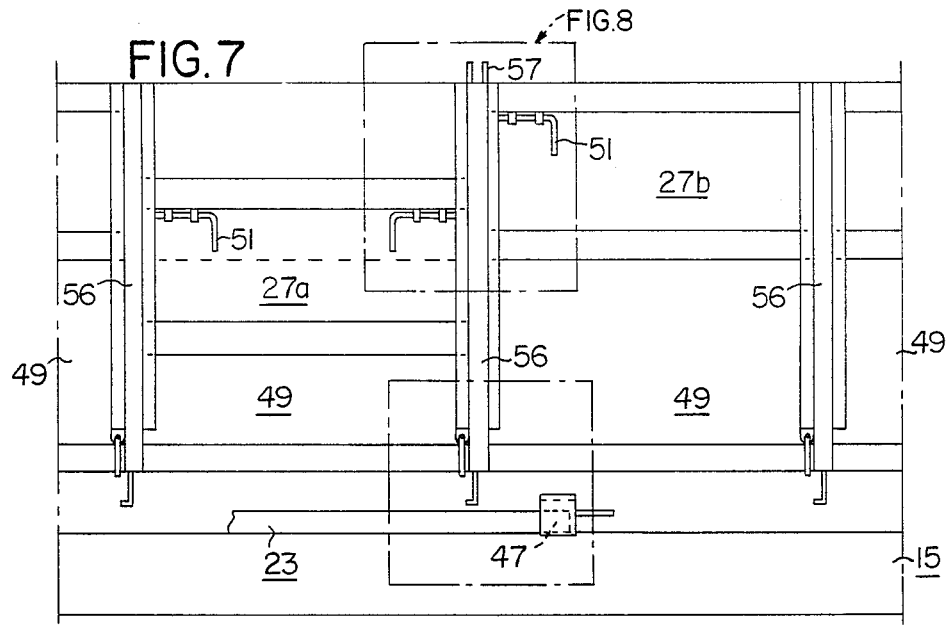
FIG. 7
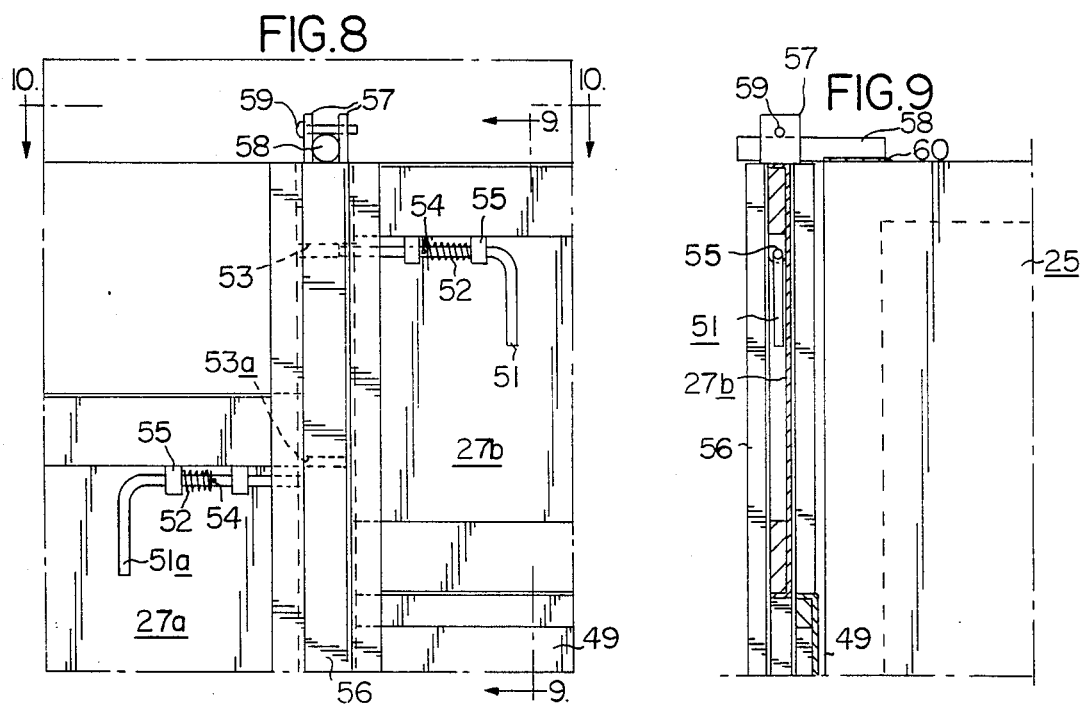
FIG. 8
FIG. 9
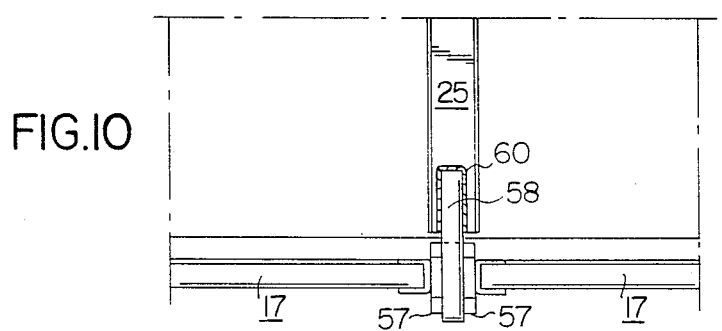
FIG. 10

HIGH LIFT DUMP TRUCK

FIELD OF THE INVENTION

The present invention relates to dump trucks having high lift capacity, and particularly for dump trucks which are useful in transporting recyclable glass and metal products in a plurality of containers so that separation at the processing site can be accomplished most conveniently.

BACKGROUND OF THE INVENTION

Ever increasing concerns for the environment have made handling of trash, rubbish and refuse of even greater importance than in prior times. Not only are environmental issues of great concern, economic efficiencies are becoming increasingly important. As recycling becomes more and more important, the equipment necessary for hauling and/or processing recyclable materials is subjected to even greater demands.

Some government agencies are requiring the separation of glass, metal, garbage and/or paper products. In some instances, glass is separated by color to facilitate recycling. When large containers, such as those holding twenty or even thirty cubic yards are employed, it is impossible to use conventional hauling vehicles to bring material to these containers, whether or not the materials have been sorted. Thus, there is a need to use conveyors, which increases the expense necessary for equipment and further increases labor and time costs. All three factors have a negative influence on the economies of recycling, and thereby reduce the effectiveness of government policies and/or requirements.

Of particular concern is the design of vehicles which are used to haul material from collection points to locations where larger quantities may be handled effectively. Removable containers which may be placed on a truck require special handling and lifting equipment, and necessitate appropriate storage facilities. Vehicles which are designed to haul specific products are often times limited to those products, if the design is not appropriate for multi-purpose hauling. In addition, special lifting mechanisms for the most part have significant capacity limitations.

Also, control in lifting containers can be considered unsafe when it is not accomplished by a positive displacement lifting mechanism. Finally, lifting designs which are limited to less than total capacity bring about repetitive steps which again increase cost through equipment, labor and time.

Conventional dump trucks are currently used in some instances to bring goods to a large processing site. These vehicles are impractical for dumping large quantities of glass, metal, and other recyclable materials. In addition, it is relatively difficult to directly transfer material from a dump truck to a large container, such as a twenty or thirty cubic yard container. If the contents of the dump truck are dumped on site and then transferred to a large container, the aforementioned duplication of expense and time is realized. It is most often not practical to drive the conventional dump trucks up onto ramps where the dumping can be elevated, because of the likelihood that an accident would occur.

Accordingly, up until the present time, there has not been an effective, efficient and economical way to transport one or more of the variety of recyclable materials found in the handling of trash and refuse.

SUMMARY OF THE INVENTION

It has now been discovered that an improved vehicle for transporting recyclable material can be provided. Specifically, a high lift dump truck has been discovered which comprises a chassis on a truck and a body portion having a tailgate and being positioned on the chassis and supported thereby in a first lowered position. The body portion includes a front hoist means having a first end pivotally mounted at a generally central location on the chassis and a second end pivotally mounted on the body portion. The front hoist means is positioned to raise the body to a maximum front elevation above the chassis. Similarly, a rear hoist means is provided having a first end pivotally mounted at a generally rear location on the chassis and having a second end pivotally mounted on the body generally near the tailgate end of the body. The rear hoist is thus positioned to raise the body to maximum rear elevation above the chassis. A control link is provided having a first end pivotally mounted on the chassis adjacent the rear location and a second end mounted on the body generally in the central portion of the body. Accordingly, this link defines a locus of movement of its second end when the body is raised. Finally, control means are provided for activating each of the front and rear hoist means independently to permit said body to be raised to both maximum front and rear elevations.

A plurality of compartmentizing removable walls are provided along with adjustable height side walls on the body described above, so that the kinds of materials and the method of loading the compartments can be accomplished by a variety of ways to accommodate different loading conditions. During unloading, the entire truck body is lifted by the two hoist means and, when the tailgate is opened, the contents can be transferred directly into large containers of thirty cubic yards or less in capacity. This transfer can be accomplished directly over the high side walls of these large containers without resort to the use of transfer equipment, thereby resulting in tremendous savings of time, money and labor.

BRIEF DESCRIPTION OF THE DRAWINGS

These and other objects of the present invention and the various features and details of the operation and construction thereof are hereinafter more fully set forth with reference to the accompanying drawings, where:

FIG. 2 is a side elevational view of the truck shown in FIG. 1 showing the compartmented body portion of the truck in its fully down position;

FIG. 3 is a plan view of FIG. 2;

FIG. 4 is a side elevational view similar to FIG. 2 but showing the compartmented body portion in a conventional dumping mode. The front hoist is actuated;

FIG. 7 is an enlarged fragmentary side elevational view of a portion of the compartmented body shown within the dot and dash outline in FIG. 2 and designated FIG. 7, showing in greater detail the side doors of the compartmented body;

FIG. 8 is a greatly enlarged fragmentary side elevational view of the portion of the side door structure included within the dot and dash outline and designated FIG. 8 showing in greater detail the elements comprising a compartmented door.

FIG. 9 is a fragmentary sectional elevation view on the line 9,9 of FIG. 8;

FIG. 10 is a fragmentary plan view taken on the line 10,10 of FIG. 8;

DETAILED DESCRIPTION OF THE PREFERRED EMBODIMENT

Figure 1:
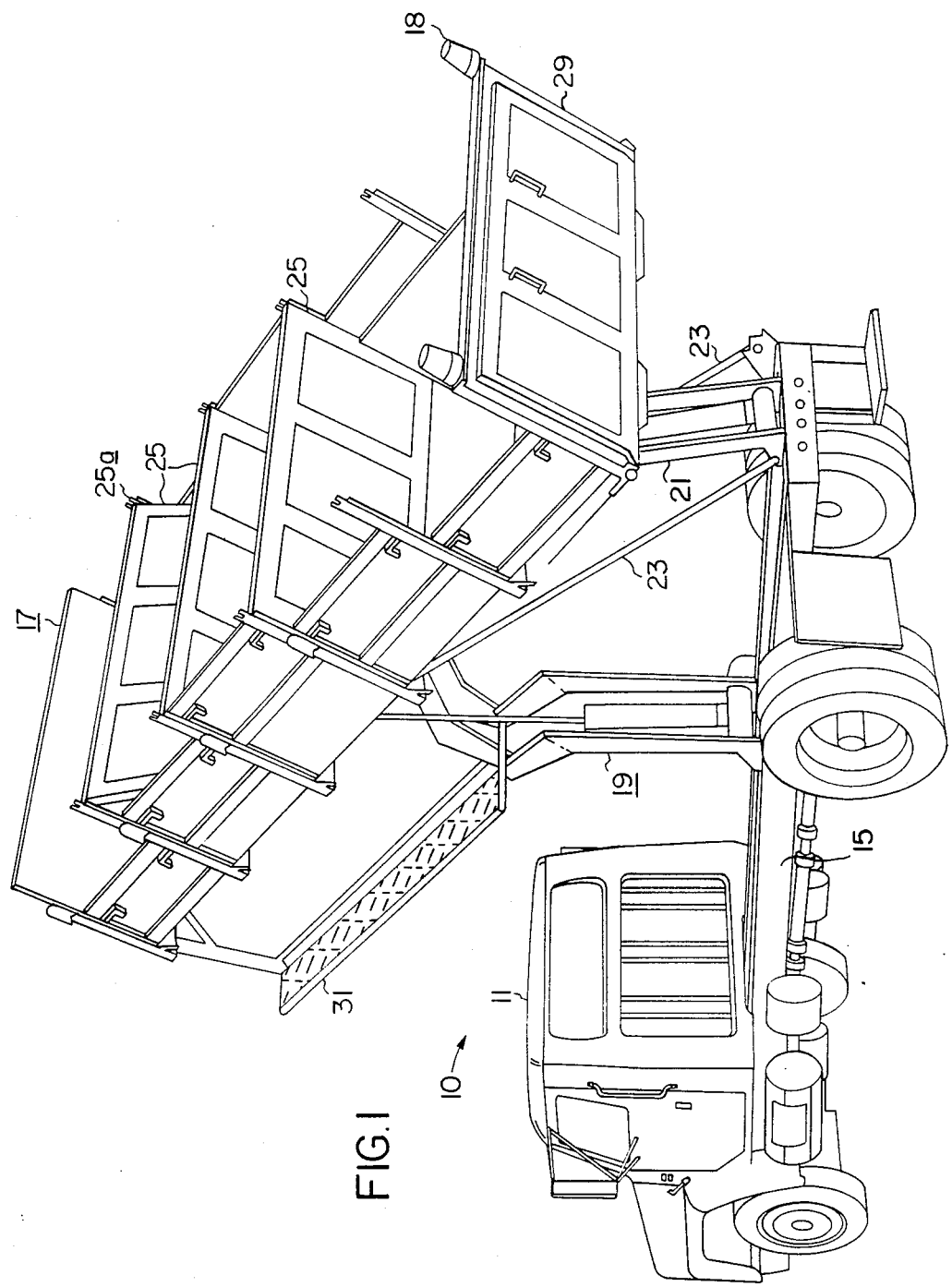
FIG. 1 is a perspective view of a high lift recycling dump truck in accordance with the invention.

As stated above, FIG. 1 is a perspective view of a high lift recycling dump truck in accordance with the present invention, and is shown generally by the reference numeral 10. The cab 11 is positioned above a motor or power source 13 in a conventional manner and mounted on a chassis 15. A compartmentalized body portion 17 is provided in accordance with the principals of the present invention. A front hoist 19 and a rear hoist 21 are adapted to lift the truck body 17 to an elevated front and rear position. Stabilizing or controlling links 23 define the lifting path so that the pivotally mounted hoist means 19 and 21 move the body to the rear of the truck at the same time as the body is being elevated.

The compartmentalized body portion 17 includes a plurality of compartmentalizing removable dividers 25 which are generally vertical and parallel to the tailgate 29. These divider walls are removable. Different materials may be placed in each of the compartments formed by the divider walls 25. The compartmentizing divider walls 25 are attached, as described hereinafter, to pivot as shown in FIG. 1 at 25ᵃ whereby the divider wall is free to pivotally remain generally vertical when the body is raised to the high lift position, to permit transfer of objects from a higher compartment to a lower compartment and out through the similarly pivoted tailgate 29.

Finally, steps 31 are provided so that the compartments, when the body 17 is in the lowered position, can be filled or otherwise attended to.

FIG. 2 shows a side elevational view of the truck with the forward cab 11 and the rearward body 17. In one optional embodiment, a beacon light 18 may be fastened to the rear of the truck or elsewhere as desired.

In the fully down position, as shown in FIG. 2, the body 17 rests on the chassis 15. Front hoist means 19 and rear hoist means 21 are both folded in upon themselves to provide a flat stable nesting of the body 17 on the chassis 15. Both hoist means are operated by control means which may be placed inside or outside the cab 11.

The controls are completely hydraulic, with a power take off drive from the transmission, so that up and down movement of both hoist means is controlled. The hoist 19 is mounted to the chassis at pivot 33 and to the body at pivot 34. The hoist itself is a two armed device and contains a pivot 35 which controls the movement of the two arms of hoist 19 as front piston 37 expands under hydraulic control to raise the front part of the body portion 17. Similarly, the back chassis pivot 39 and back body pivot 40 provide two pivotable supports for the rear hoist 21. Rear hoist 21 has its two sections pivotable about back hoist pivot 41 so that expansion of back piston 43 will cause the rear portion of the body 17 to be raised to its maximum rear elevation.

Shown in FIG. 4 is the operation of the present invention in a conventional dump truck manner. Specifically, the front hoist member 19 is expanded to raise the front portion of the body 17. The hoist 19 pivots on the chassis about pivot point 33, and on the body about pivot point 34. Expansion of the hoist 19 causes it to straighten and pivot about front hoist pivot 35. Tail gate 29 can be loosened, as will be described hereinafter, to allow the material contained in the body 17 to be dumped. Also shown in FIG. 4 are steps 31 which permit access to body side walls 27, again as will be described in greater detail hereinafter.

Figure 5:
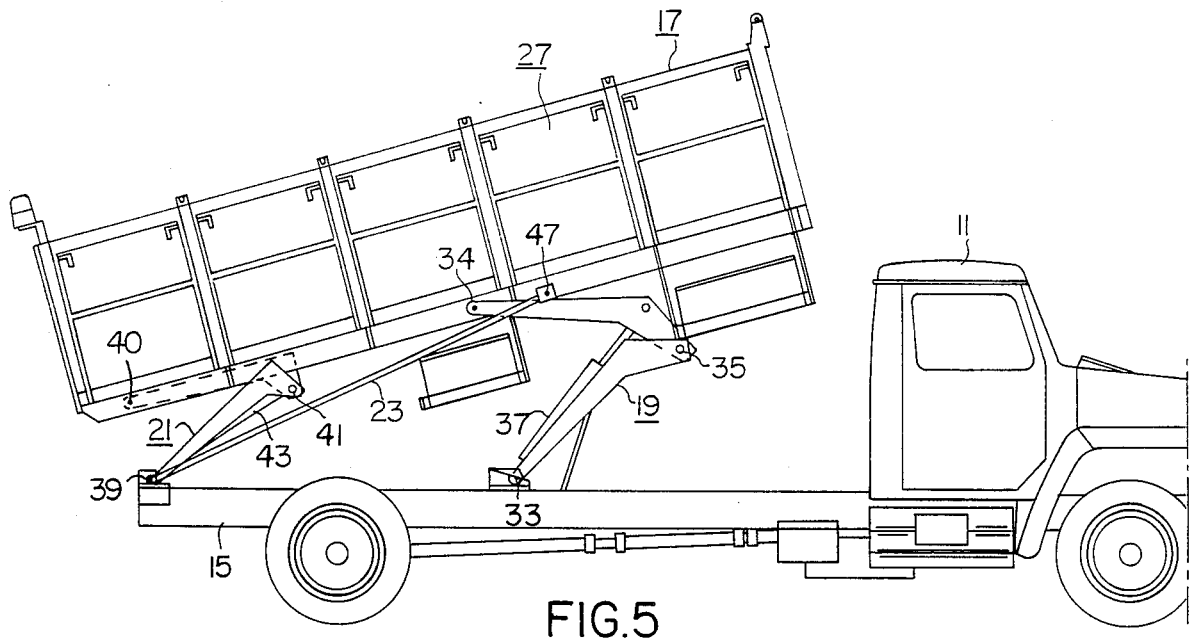
FIG. 5 is a side elevation view similar to FIG. 2 but showing the compartmented body portion in an intermediate lifting mode showing both the front and rear hoist having been actuated.

As shown in FIG. 5, the compartmented body portion 17 is in a partially raised position, such that front hoist 19 has been partially extended to raise the front portion of the body 17. The rear hoist member 21 has also been used to raise the rear portion of the body 17, although neither have been raised to a fully elevated position.

In FIG. 5, the function of the control links 23 are readily apparent. As the force from the front piston 37 and rear piston 43 cause the two hoists 19 and 21 respectively to expand, depending upon the location of the load and the sequence of operation between the two hoist members 19 and 21, the body 17 will have a tendency to move along the linear axis of the chassis 15.

As was described, the front hoist is attached to the chassis at pivot 33 and the rear hoist member is attached to the chassis at pivot 39. Similarly, the body 17 is attached to the front hoist at pivot 34 and to the rear hoist at pivot 40. Because both ends of both hoist members 19 and 21 are pivotally mounted, expansion of either piston 37 or piston 43 will tend to shift the weight of the body 17 as it is raised. Because of control links 23, which are pivotally mounted to the chassis 15 at pivot point 39 and to the body at pivot point 47, the body will move to the rear of the vehicle as it is raised. Specifically, control links 23 pivot about the fixed pivot point 39 with respect to the chassis 15, as the control link pivot 47 moves upward and rearward to the maximum elevation point. Because control links 23 are rigid, point 47 remains a fixed distance away from pivot point 39, which distance is defined by the length of control link 23.

Figure 6:
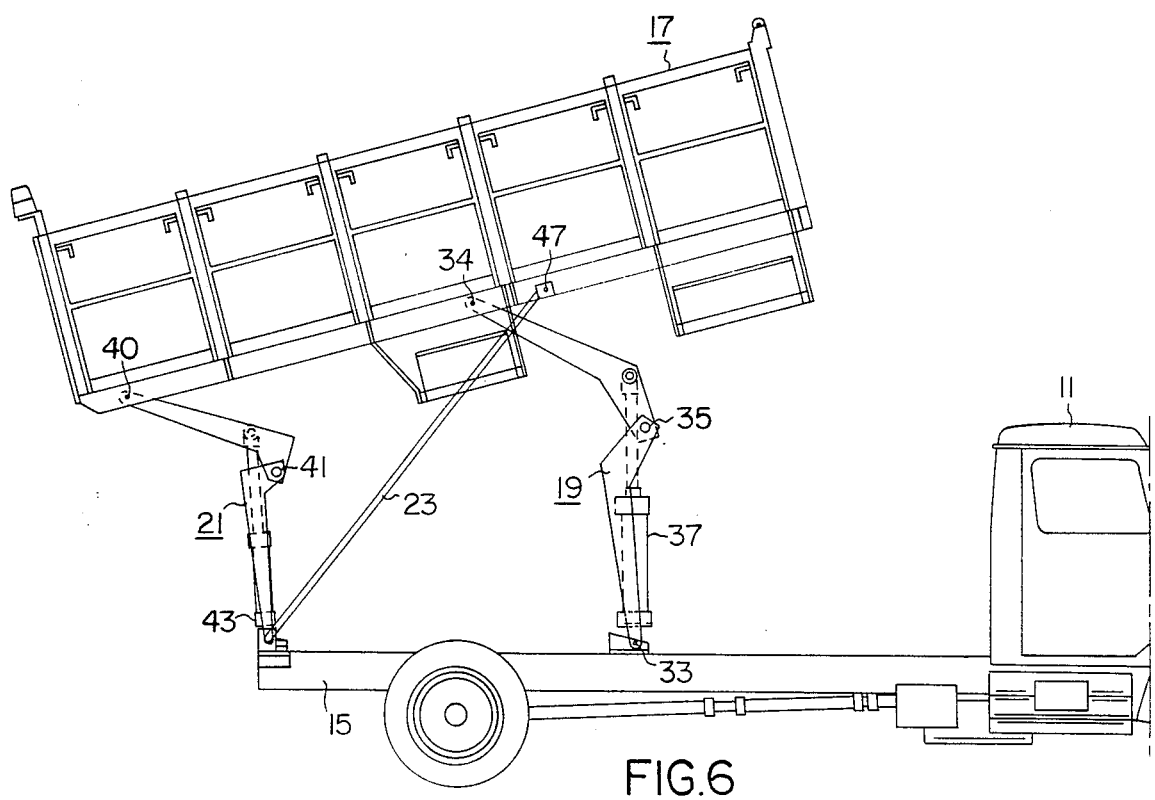
FIG. 6 is a side elevational view similar to FIG. 2 but showing the compartmented body portion elevated to it's maximum height by means of the front and rear hoist members under the control of the two locus control links or stabilizers.

As is more clearly shown in FIG. 6, the maximum front and rear elevation is produced when the piston 37 and piston 43 are extended to their maximum extensions, so that pivot point 47 is a maximum distance from the chassis 15. In order to provide an adequate angle for dumping the contents of the body 17, the maximum front elevation should preferably range from about 1.1 to about 2.0 times higher than the maximum rear elevation. Of course, to increase the angle that the body 17 makes with the chassis 15 and with the ground, the rear hoist 21 can be retracted to lower the rear end of the body. In its fully expanded position, as shown in FIG. 6, the rear elevation is sufficient to provide clearance over the side walls of large containers of more than 30 cubic yards capacity. The front elevation is still sufficiently greater than the rear elevation to permit the contents of the body 17 to transfer to that large container.

The side doors of the compartmented body 17 are more clearly illustrated in FIG. 7, which is a fragmentary enlarged side elevational view of that portion of the compartment body shown with dot and dash outline in FIG. 2. In this view, the lower side wall 49 is permanently mounted to the body portion while the upper side walls 27$^a$ and 27$^b$ can be adjusted to a varying height so that when less than a full load is put in one of the compartments, such as when extremely heavy materials are loaded which will not fill the entire volume of the compartment. The compartment can be adjusted to accommodate the load.

The position of the adjustable side walls 27$^a$ and 27$^b$ is set by use of locking handles 51 which ©an be provided for all of the upper walls of the compartmented body portion 17. In fact, the lower portions 49 could also be provided with adjustment features of this type in an alternative embodiment which is not preferred herein.

As is more clearly shown in FIG. 8, the locking handle 51 is biased by a spring 52 to engage slot 53. Pin 54 operates against spring 52 and one of the guide sleeves 55 to urge the handle 51 into the slot 53. Pulling against the bias of spring 52 will allow the handle 51 to be removed from the slot 53, whereby the side wall 27$^b$ can be raised or lowered to a different height. Preferably, the handle 51 then engages in a different slot 53$^a$ and the like.

As shown in FIG. 8, locking handle 51$^a$ has been pulled away from slot 53$^a$ for adjustment of adjustable side wall 27$^a$.

Slots 53, 53$^a$ and others are carried in the post 56 which terminates in an upper bifurcated terminal end 57. As shown in FIGS. 8, 9 and 10, the removable compartment walls 25 are carried in the bifurcated terminal end 57 by stub shafts 58 which are welded onto the upper terminal edges of wall 25 and held in place by pin 59. Weld 60 is shown in FIGS. 9 and 10, attaching the stub shaft 58 to the wall 25. Thus, the wall is held in place as long as pin 59 is in place, but it is free to pivot about shaft 58 when the bottom end of the wall 25 is freed from restraint. Removal of pin 59 and removal of the bottom end restraint will allow the compartment wall 25 to be removed. Since all of the compartment walls are virtually identical in size and shape, and all have stub shafts 58 mounted thereon as described herein, the compartment walls are interchangeable.

Figure 11:
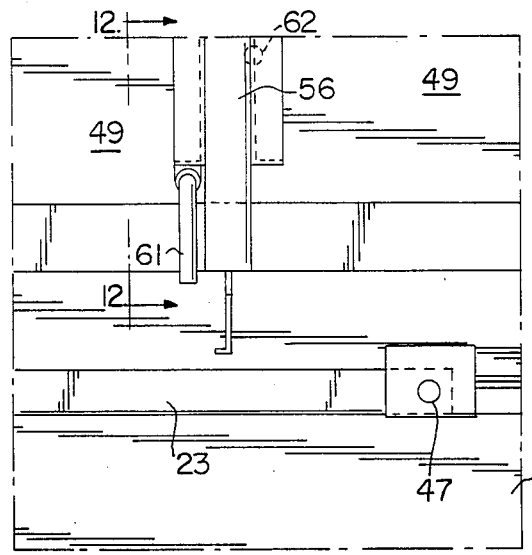
FIG. 11 is an enlarged fragmentary side elevational view of the details included within the dot and dash outline and designated FIG. 11 on FIG. 7 showing detail of the compartment divider latching means.
Figure 12:
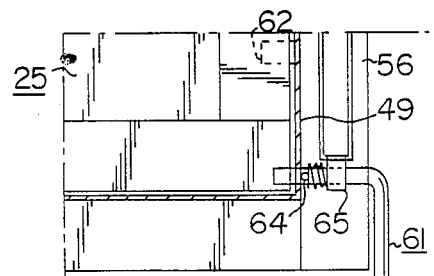
FIG. 12 is a fragmentary sectional view taken on the line 12,12 of FIG. 11 showing additional details of the compartment divider latching means.

As shown in FIGS. 11 and 12, the bottom end of compartment wall 25 is selectively held in place by a similar arrangement. Specifically, a looking handle 61 is biased to fit the handle 61 behind compartment wall 25 to prevent it from swinging backwards. A one inch diameter cylindrical steel pin 62 is welded to each side wall 49 approximately eight inches above the truck bed and lies adjacent the forward side of the compartment wall 25 and provides a thick stop to prevent compartment door 25 from swinging forwardly. When appropriate, the handle 61 is pulled to free the handle, so that the compartment wall 25 can move and pivot about the stub shafts 58 which are on the top of the wall 25. Thus, when the compartmented body portion 17 is raised to an elevated position, handle 61 can be pulled to release the bottom of wall 25, and material constrained by the wall 25 can slide under the bottom, as shown by wall 25$^a$ in FIG. 1. Each of the walls can be freed to pivot about their stub shafts 58 in this manner, to permit selective emptying and mixing from the various compartments formed by the various walls 25, 25$^a$ and the like.

Figure 13:
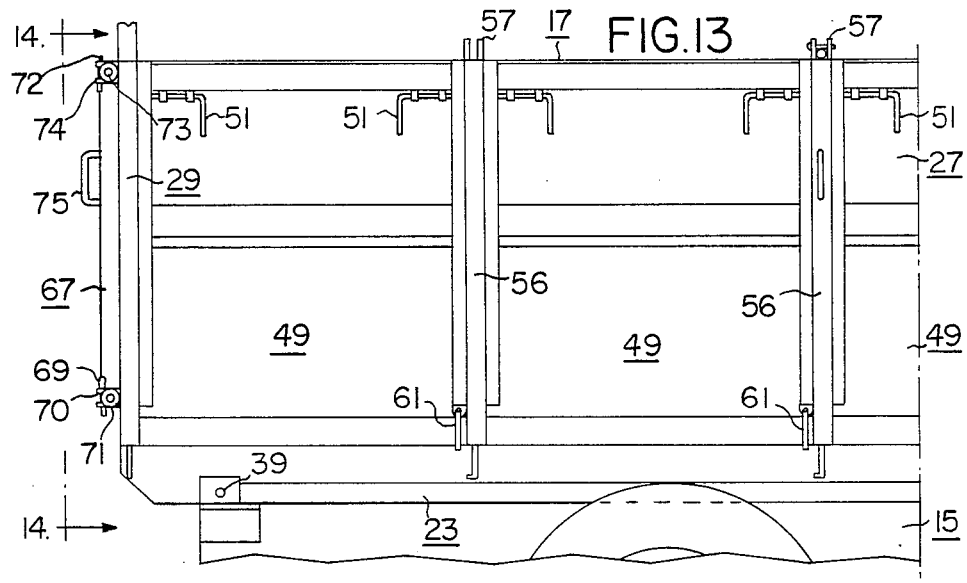
FIG. 13 is an enlarged fragmentary side elevational view of the rear portion of the compartmented body structure and its associated tail gate.
Figure 14:
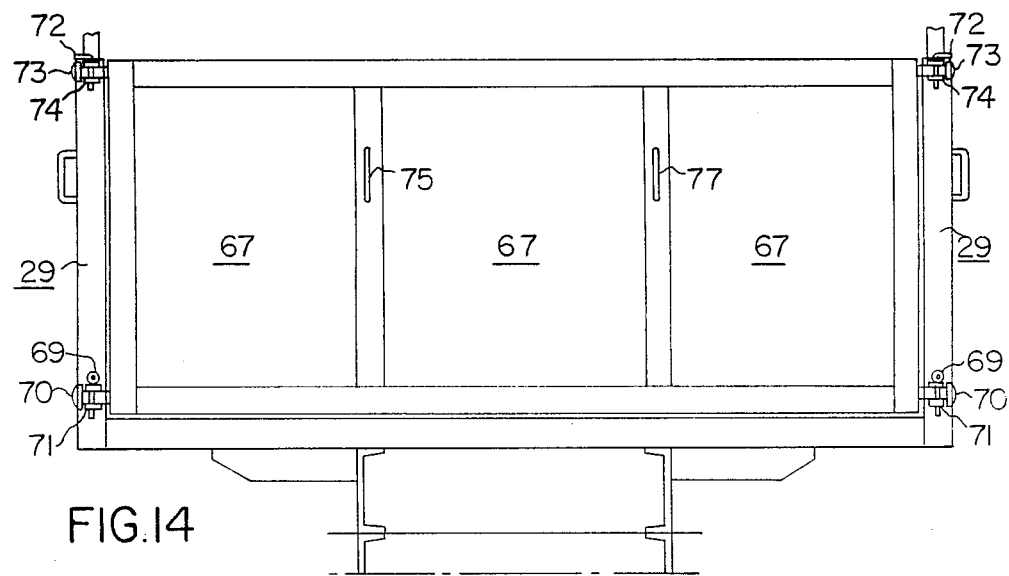
FIG. 14 is an end elevational view taken on the line 14,14 of FIG. 13 showing additional details of the tailgate mounting.

In FIGS. 13 and 14, the tailgate 67 is shown as it is held in the tailgate frame 29. Specifically, the tailgate 67 is restrained at the bottom by locking pins 69 which contain the stub shafts 70 which are attached to the bottom terminal outer edges of the tailgate 67 and which fit into a bifurcated member 71 mounted on the tailgate frame 29. Locking pins 69 allow the stub shaft 70 to escape from the bifurcated member 71, so that the tailgate can pivot and discharge product when the compartmented body portion 17 has been elevated. Similarly, the tailgate 67 is attached to the tailgate frame 29 at its top by locking pins 72 which restrain stub shafts 73 mounted at the top of the tailgate 67. Again, a bifurcated member 74 is mounted on the top end of the tailgate frame 29. When the locking pins 72 are in position, thereby restraining stub shafts 73, removal of the handle 69 at the bottom will allow the tailgate 67 to pivot about that shaft 73. Similarly, removal of the locking pins 72 will allow the tailgate 67 to pivot about shaft 70. If both locking pins 69 and 72 are removed, the tailgate can be withdrawn using handles 75 and 77.

While particular embodiments of the present invention have been illustrated and described herein, it is not intended to limit the invention and changes and modifications may be made therein within the scope of the following claims.

What is claimed is:

1. A high lift dump truck 10 comprising:
  a chassis 15;
  a body portion 17 having a tailgate 29 and being positioned on said chassis;
  a multiple link front hoist means 19 having a first end pivotably mounted at a generally central location on said chassis, said front hoist means having a second end pivotably mounted on said body portion 17, said front hoist means being positioned to raise said body portion to a maximum front elevation above said chassis;
  a multiple link rear hoist means 21 having a first end pivotably mounted at a generally rear location on said chassis, said rear hoist means having a second end pivotably mounted on said body portion generally near the tailgate of said body portion, said rear hoist means being positioned to raise said body portion to a maximum rear elevation above said chassis;
  control link means 23 having a first end pivotably mounted on said chassis adjacent said rear location and having a second end mounted to said body portion at a generally central location thereon, said control link 23 maintaining a fixed distance between said rear location on the chassis and said central location on the body portion; and
  control means for activating said front and rear hoist means independently to permit said body portion to be raised to said maximum front and rear elevations;
  whereby said first and second multiple link hoist means 19 and 21 and said control link 23 cooperatively translate said body portion rearwardly relative to said chassis when said body portion is raised.

2. The truck of claim 1, wherein the front hoist is sized to reach a maximum front elevation which is 1.1 to 2.0 times higher than the maximum rear elevation.

3. The truck of claim 1, wherein said body portion includes a plurality of compartment walls parallel to the tailgate of said body portion to divide the body portion into a plurality of compartments.

4. The truck of claim 3, wherein said tailgate is pivotably mounted to pivot about its top end when said body portion is elevated.

5. The truck of claim 4, wherein said compartment walls are pivotably mounted to selectively pivot about their top ends when said body portion is elevated.

6. The truck of claim 1, wherein at least a portion of the side walls of said body portion are selectively adjustable vertically to allow variations in the height of the side wall portions.

7. The truck of claim 6, which further includes side steps mounted to said body portion and positioned to assist access to said adjustable side wall portions.

8. A high lift dump truck comprising:
a chassis;
a body portion having a tailgate and having a plurality of compartment walls parallel to the tailgate of said body portion to divide the body portion into a plurality of compartments, said tailgate and compartment walls being pivotably mounted with spring bias pivot means to selectively pivot about their top ends, said body portion being positioned on said chassis and having side walls which are selectively adjustable vertically with spring bias latch means to allow variations in the height of said side walls;
a multiple link front hoist means having a first end pivotably mounted at a generally central location on said chassis, said front hoist means being positioned to raise said body portion to a maximum front elevation above said chassis;
a multiple link rear hoist means having a first end pivotably mounted at a generally rear location on said chassis, said rear hoist means having a second end pivotably mounted on said body portion generally near the tailgate of said body portion, said rear hoist means being positioned to raise said body portion to a maximum rear elevation above said chassis wherein the front hoist is sized to reach a maximum front elevation which is 1.1 to 2.0 times higher than the maximum rear elevation;
control link means having a first end pivotably mounted on said chassis adjacent said rear location and having a second end mounted to said body portion at a generally central location thereon, said control link maintaining a fixed distance between said rear location on the chassis and said central location on the body portion; and
control means for activating said front and rear hoist means independently to permit said body portion to be raised to said maximum front and rear elevations;
whereby said first and second multiple link hoist means 19 and 21 and said control link 23 cooperatively translate said body portion rearwardly relative to said chassis when said body portion is raised.

9. The truck of claim 8, wherein said body portion further includes side steps positioned to assist access to said adjustable side walls.

10. The device of claim 8, wherein said multiple link front hoist means includes a first link pivotably mounted to said chassis, a second link pivotably mounted at one end to said first link and pivotably mounted at its other end to said body portion, and hydraulic piston means for activating said hoist means.

11. The device of claim 8, wherein said multiple link rear hoist means includes a first link pivotably mounted to said chassis, a second link pivotably mounted at one end to said first link and pivotably mounted at its other end to said body portion and hydraulic piston means for activating said hoist means.

* * * * *